United States Patent [19]

Ausnit et al.

[11] Patent Number: 4,682,366

[45] Date of Patent: Jul. 21, 1987

[54] ATTACHMENT OF PLASTIC ZIPPER TO INCOMPATIBLE BAG WALL WEB

[75] Inventors: Steven Ausnit, New York; Per Bentsen, Suffern, both of N.Y.

[73] Assignee: Minigrip, Incorporated, Orangeburg, N.Y.

[21] Appl. No.: 769,894

[22] Filed: Aug. 27, 1985

[51] Int. Cl.⁴ ............................................. B65D 33/16
[52] U.S. Cl. ........................................ 383/65; 24/576; 24/587; 156/66; 383/35; 428/139; 493/390
[58] Field of Search .............. 493/213, 214, 927, 390; 156/66, 293; 24/587, 576; 383/63, 65, 35; 428/139, 140

[56] References Cited

U.S. PATENT DOCUMENTS

| Re. 28,969 | 9/1976 | Naito | 150/3 |
|---|---|---|---|
| 2,056,856 | 1/1936 | Hora | 24/205 |
| 2,542,295 | 2/1951 | Gottesman | 383/107 X |
| 2,701,222 | 4/1951 | Herzel et al. | 154/116 |
| 2,791,807 | 5/1957 | Morin | 18/59 |
| 2,821,764 | 2/1958 | Leahy et al. | 21/142 |
| 2,914,936 | 12/1959 | Reinold | 24/576 X |
| 3,462,803 | 8/1969 | Horton | 24/150 |
| 4,341,575 | 7/1982 | Herz | 156/66 |
| 4,430,070 | 2/1984 | Ausnit | 493/215 |
| 4,532,166 | 7/1985 | Thomsen et al. | 428/140 X |

FOREIGN PATENT DOCUMENTS

| 477004 | 7/1953 | Italy | 428/140 |
|---|---|---|---|
| 0097451 | 2/1961 | Norway | 383/63 |
| 312954 | 4/1956 | Switzerland | 24/576 |

Primary Examiner—William Price
Assistant Examiner—Bryon Gehman
Attorney, Agent, or Firm—Hill, Van Santen, Steadman & Simpson

[57] ABSTRACT

Bags especially adapted to be made from fusibly incompatible bag body web material and extruded plastic zippers comprising in each instance a pair of zipper strips having reclosable zipper profiles located below upper ends of pull flanges, and fused connecting anchors extending from the zipper strips through holes in the material of the bag body and thereby permanently attaching the zipper strips to the bag body. The portions of the bag body material having the anchor holes may be received in groove sockets in the zipper strips, where the zipper strips are located at the inside of the bag. The zipper strips may be located on the outside of the bag and sealably pinch material of the bag body material in and between interlocking profiles, with ends of the zipper strips secured to the sides of the bag by fused anchors extending through holes in side seams on the bag body. Method of making the bags is disclosed.

18 Claims, 16 Drawing Figures

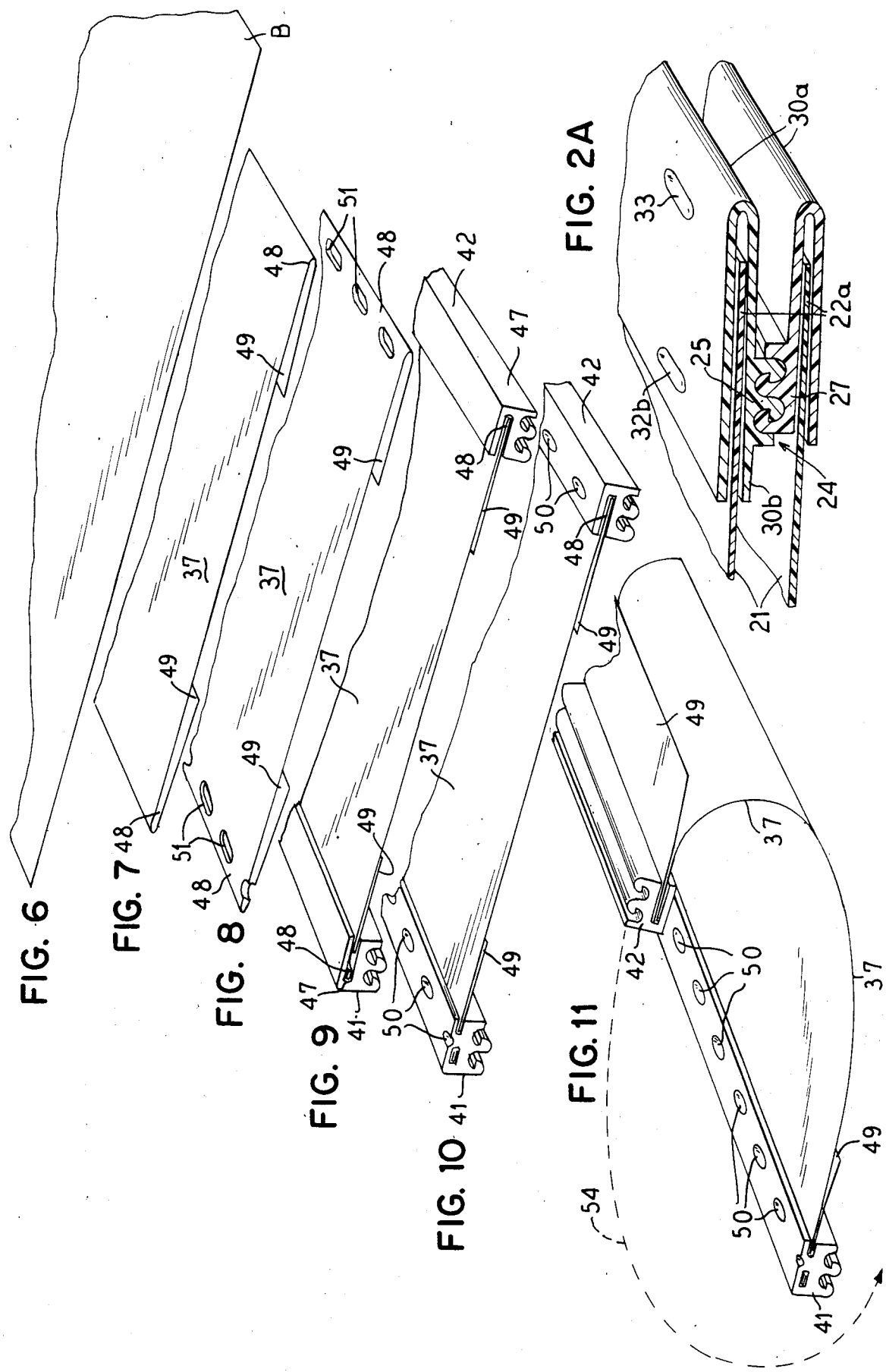

ATTACHMENT OF PLASTIC ZIPPER TO INCOMPATIBLE BAG WALL WEB

BACKGROUND OF THE INVENTION

This invention relates to the art of bag making, and is more particularly concerned with bags having reclosable zippers of the extruded complementary rib and groove type.

Heretofore, numerous and varied bag structures of this type have been proposed and some have achieved substantial commercial success.

For example, U.S. Pat. No. Re. 28,969 discloses a bag structure in which the bag body web and the zipper profiles are extruded in one piece and the bag has pull flanges which project outwardly relative to the zipper.

In U.S. Pat. No. 4,430,070 the zipper is fusibly attached to the bag wall web spaced inwardly from the pull flanges which project outwardly from the zipper.

Both of these examples require that the bag body web and the zipper profiles be fusibly compatible, that is that one can be fused onto the other by some sort of heat sealing means.

On the other hand, U.S. Pat. No. 4,341,575 is representative of disclosures wherein zipper strips are attached to the bag wall web by adhesive means, and which would permit fusibly incompatible materials to be used. However, it will be noted that this disclosure requires fairly critical parameters in the adhesive attachment to avoid separation of the elements. Adhesive attachment generally involves some messiness due to the necessary manner of application of the adhesive to the elements.

Fused attachment of the elements is generally preferred, but presents a problem where the zipper strips and the bag body web are fusibly incompatible. For example, while polypropylene may be fused to polypropylene, and polyethylene may be fused to polyethylene, there is great difficulty encountered in any attempt to fuse or heat seal polyethylene to polypropylene. In bags, while polyethylene is widely used, both for the bag body web material and also for the profiled zipper strips, for one thing because of the ease of extruding such material, the polyethylene material does not afford the imperviousness that is frequently desired where fluid barrier is required. Sometimes, also, other web material incompatible to fusing together with polyethylene may be desired, while the profiled zipper strips should be extruded from polyethylene.

It is to the problem of making bags from fusibly incompatible bag body web material and extruded plastic profile zipper strips that the present invention is directed.

In the prior art, there has been the suggestion in U.S. Pat. No. 2,791,807 that separable fasteners with stringers be constructed of extruded plastic profile fasteners attached to fabric stringer tapes so that the plastic strips may be attached by sewing the fabric tape stringers to the articles to which the fastener strips are desired to be secured. The structure in that patented disclosure does not lend itself to embodiment in bags, and more particularily bags made from plastic wall web material, and provided with pull flanges at their open tops.

SUMMARY OF THE PRESENT INVENTION

It is, accordingly, an important object of the present invention to provide a new and improved bag structure made from fusibly incompatible bag wall web material and extruded plastic zipper and in which the bags are provided with pull flanges.

Another object of the invention is to provide bag structure as just indicated in which the fusibly incompatible bag wall web material and the extruded zipper are secured together by fusibly locking parts of the zipper to one another for securing the zipper to the bag wall web.

Accordingly, the present invention provides a bag having a thin web material body with an openable top flanked by opposed upwardly projecting pull flanges and extruded plastic zipper means carried by said body along said pull flanges, and wherein, said bag body and said zipper means are fusibly incompatible, said zipper means comprising a pair of strips having complementary separably interlockable zipper profiles located substantially below upper ends of said pull flanges, holes in said bag body material, and fused connecting anchors extending from said zipper strips through said holes and permanently attaching said zipper strips to said bag body.

A new and improved method is provided for making the bag structure assembly of the fusibly incompatible materials.

BRIEF DESCRIPTIONS OF THE DRAWINGS

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure and in which:

FIG. 2A is a modificatiion of FIG. 2.

Figure 5:
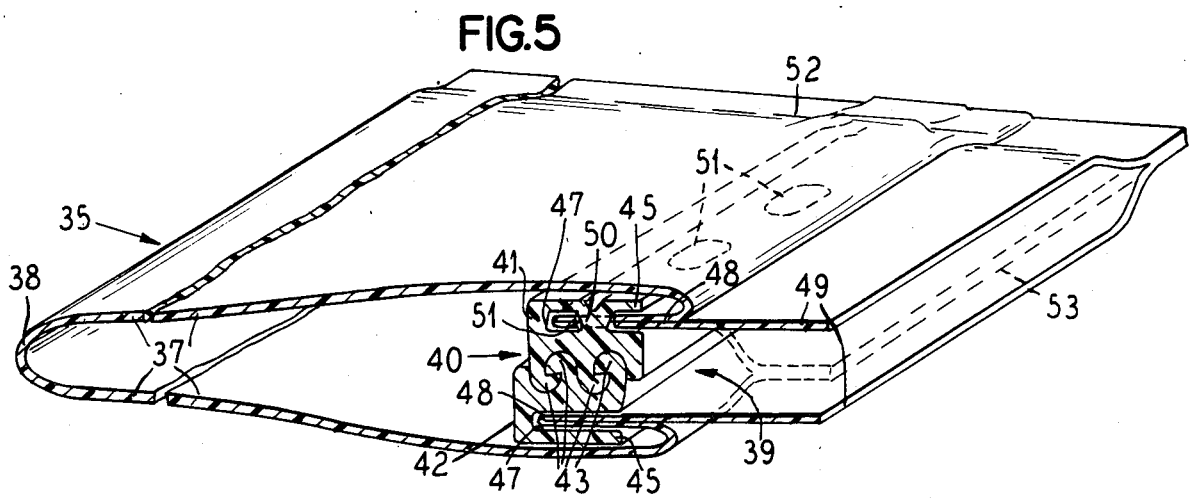
FIG. 5 is a fragmental isometric view showing a further modification.

FIGS. 6–15, inclusive are fragmentary isometric, more or less schematic views showing how assembly and manipulation of the bag wall web and the fastener strips for the zipper are assembled and manipulated to arrive at the structure exemplified in FIG. 5.

DETAILED DESCRIPTION

Throughout the description, it will be understood that various parts of the structure may, for illustrative purposes, be dimensionally exaggerated and that, as a matter of fact, cross sectional dimensions as well as some other dimensions may in actual practice be on a much smaller scale. Dimensions may vary, as is well known in this art, depending upon strength factors required, uses to which the ultimate may be put, etc.

Figure 1:
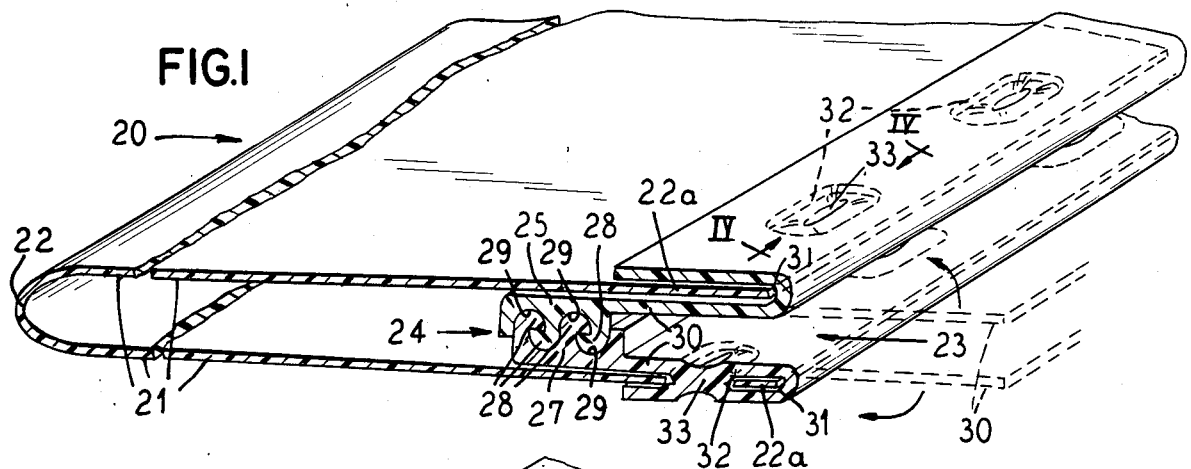
FIG. 1 is a fragmental isometric perspective view showing bag making material embodying the present invention.

Referring to FIG. 1, a bag structure 20 is shown as though just completed in a continuous ribbon and before cross sealing and separating into individual bag sections. The structure 20 comprises a bag wall web 21 folded upon itself to provide a closed bag bottom 22 and having upper end margins 22 between which is defined a bag mouth top opening 23. Alternately if an open bottom bag is desired, two separate bag walls can be used instead of one folded wall.

A reclosable zipper 24 is secured to the bag wall web 21 at the margins 22a. In a desirable form, the zipper 24 comprises complementary zipper strips 25 and 27 wherein each of the strips has a plurality of hook shaped ribs 28 which are releasibly interlocked with one another within complementary grooves 29. Each of the zipper strips 25 and 27 has along one longitudinal side a lateral base continuation in the form of a flange 30 which is of sufficient original width, as indicated in dash outline, to be folded upon itself to provide along the length of the zipper strip a flat socket 31 receptive of the respective associated bag wall web margin 22a. If preferred, the flanges 30 may be initially formed in the folded fashion to provide the sockets 31. In either event, the reentrant groove or socket 31 in each instance will not only receive the web margins 22a but provide with those margins multi-layer rugged pull flanges for the associated bag for pulling the ziper 24 open when desired. This is an especially desirable structure where the bag wall web is of a material such as polyproplyene or the like of very thin section which might in and of itself be of insufficient form retention to provide satisfactory pull flanges. Such a condition may be encountered where it is desired to have the bag body web of a thin plastic such as polyproplyene, while the zipper strips 25 and 27 are extruded from polyethylene.

These materials are relatively fusibly incompatible, at least in a practical sense in the plastic bag art. While the zipper flanges 30 may be adhesively secured to the bag wall web margins, such securement presents problems as has been previously discussed. According to the present invention, all of the advantages of bags provided with pull flanges, and in particular multi-layer pull flanges is attained by providing the web margins 22a with perforations 32 at suitable intervals along the length of the margins received within the sockets 31, and heat sealing the turned flanges 30 to themselves through the perforations 32 as shown at 33. This provides solid connecting anchors at 33 which permanently secure the zipper strips to the bag wall web. By having the apetures 32 elongated in the direction of the length of the zipper strips, the anchors 33 can be likewise elongated in that direction. Thereby, advantageous shear strength is provided for resisting outward pulling forces applied to the web margins 22a within the multi-layer pull flanges when manipulating the same for pulling the zipper 24 open. It will be observed that the zipper profiles 28, 29 are located substantially below the upper ends of the pull flanges, so that ample width of the pull flanges extends upwardly, that is toward the top end, of the bag to facilitate grasping of the pull flanges when desired.

For reclosing the zipper after it has been opened, it is merely necessary to apply pressure to the profile areas of the zipper strips through the bag walls 21 and thereby press the zipper profiles into interlocking relation. As is known, with this kind of zipper in which the zipper strips are extruded plastic members, the profiles are resiliently flexibly enterengagable and separable. By having the zipper strips 25 and 27 unattached to the bag walls 21, except at the anchors 33, the bag walls 21 are adapted to expand away from the closed zipper 24 under the influence of normal internal pressures, so that the zipper will not be pulled open by reason of those internal pressures.

However, if it is desirable for the bag to resist over and above normal internal opening pressures, the zipper section 25 is provided with a flange 30 on the other side of the zipper profiles which extends in a direction opposite to that of flange 30 before said flange was bent over and with a continuation of the bent over zipper flange 30. In addition the web margins are provided with a second set of perforations 32b so that the flange 30 can be heat sealed to the continuation of the folded zipper flange 30 through said perforations 32b at the same time that the zipper flange 30 is sealed to itself through the perforations 32.

Figure 2:
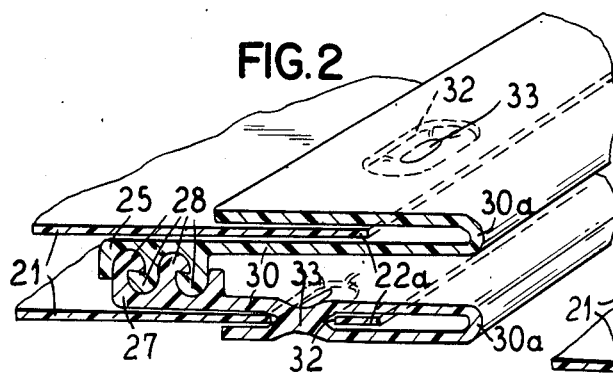
FIG. 2 is a fragmentary view similar to FIG. 1 but showing a slight modification.
Figure 3:
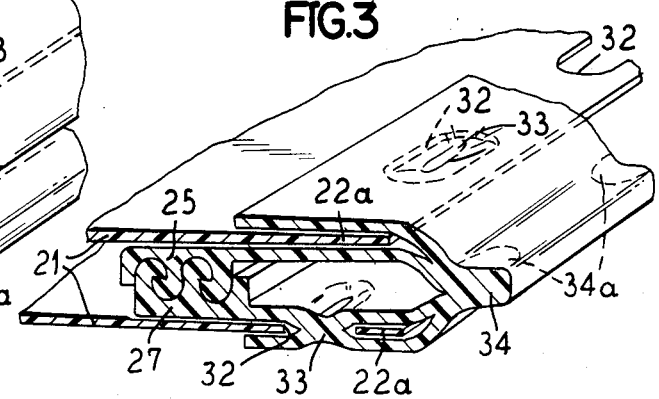
FIG. 3 is a view similar to FIG. 2 but showing another slight modification.
Figure 4:
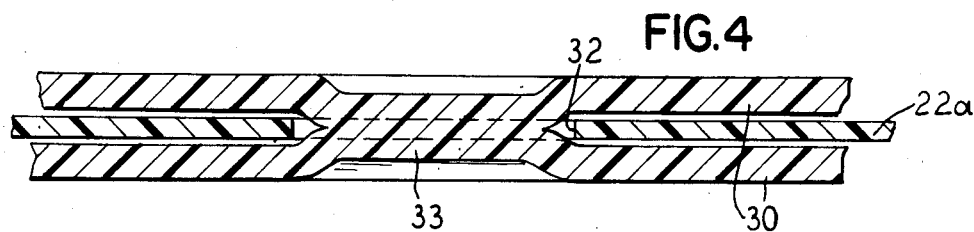
FIG. 4 is an enlarged fragmentary sectional detail view taken substantially along the line IV—IV in FIG. 1.

If it is desired to provide the zipper 24 with pilferproof means, that is with a means that will retain the bag 20 closed until it is legitimately opened, the arrangement depicted in FIGS. 2 and 3 may be employed. Here the various components may be substantially the same as in the structure of FIG. 1 except for the pilferproof feature, and therefore without going into a repetition of the description, identical reference numerals in FIGS. 2 and 3 will be understood to relate to the same description of the identically enumerated elements of FIG. 1. In FIGS. 2 and 3, the lateral flange extension 30 are formed longer than the flange extensions 30 in FIG. 1 so that upon doubling the flange extensions 30 upon themselves for the same purpose and to the same effect as in FIG. 1, fold projections 30a are formed which extend substantially beyond the edges of the bag wall margins 22. Then, by fusibly sealing the folds 30a together, a pilferproof top seal 34 is produced. The pilferproof seal may either extend continuously along the length of the zipper 24, or may take the form of spot seals 34a at desirable intervals along the zipper length. In either event, in order to open the bag, it will be necessary to snip off or rip open the pilfer proof seal, or tear it along a line of weakened tear resistance.

While the constructions shown in FIGS. 1-4 do not provide a complete barrier bag, that is, a bag which is thoroughly sealed against leakage of fluid, vapor or gas, where that is a consideration, the bag construction 35 disclosed in FIG. 5-15 meets that requirement. In the bag 35, thin bag wall web 37 is folded upon itself to provide a closed bottom 38 and an openable top 39 reclosable by means of a zipper 40. In this instance, the zipper 40 comprises a zipper strip 41 which is complementary to a zipper strip 42, both of the zipper strips comprising extruded plastic sections having interlockable complementary transversely hook shaped profiles 43 and corresponding grooves 44. Each of the zipper strips 41 and 42 has a return bent base flange 45 directed toward the outer end of the bag and providing an outwardly opening longitudinally extending slot-like socket groove 47. Within the socket groove 47, in each instance, is received in a tucked in fashion a double folded web 48 of the outer marginal portion of the associated bag body wall 37. From each of the tucked in fold webs 48, a pull flange terminal extension 49 projects outwardly.

Fixed, anchored attachment of the bag wall fold flanges 48 within the socket grooves 47 is effected by fused connecting anchors extending to and between the zipper strips through holes 51 formed in the fold web 48 at suitable intervals along their length. That is, the anchors 50 are formed by fusing the zipper flanges 45 through the openings 51 to the opposed zipper strip body bases.

Then, to provide complete barrier sealing of the bag 35, not only are the opposite sides of the bag cross-sealed as shown at 52, but the outer edge portions of the pull flanges 49 are sealed together as shown at 53. While the zipper 40 and the bag body material may not be fusibly compatible, the zipper strips 41 and 42 are fusibly compatible with one another, and the material of the bag walls 37 is fusibly compatible with itself, so that the seals 52 and 53 thoroughly seal the sides and top of the bag while the bottom of the bag is, or course, thoroughly sealed by being simply the fold 38. In this fashion the zipper, which may not be impervious to gas or vapor has been completely encompassed by the bag body walls. In addition, of course, the top seal 53 serves as a pilfer proof structure.

A series of steps in a method of making the bag 35 are exemplified in FIGS. 6–15. A continuous web of bag body film B (FIG. 6) is advanced step-by-step through the forming process, being first folded over along its side margins as shown in FIG. 7 to provide the folds 48. Then (FIG. 8), the folds 48 are punched to provide the series of spaced anchor holes 51 which, as shown are longitudinal elongated. Thereafter (FIG. 9), the zipper strips 41 and 42, as supplied in continuous strip form, are assembled so that the folds 48 are received with in the groove sockets 47, then the anchors 50 fused through the openings 51 (FIG. 10) to anchor the bag body material and the zipper strips to one another.

Figure 12:
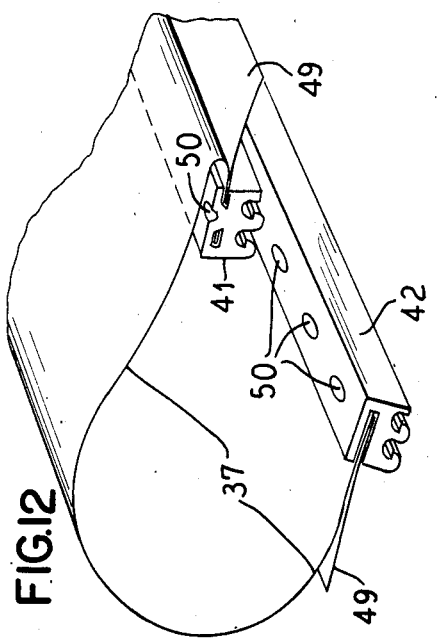
Figure 15:
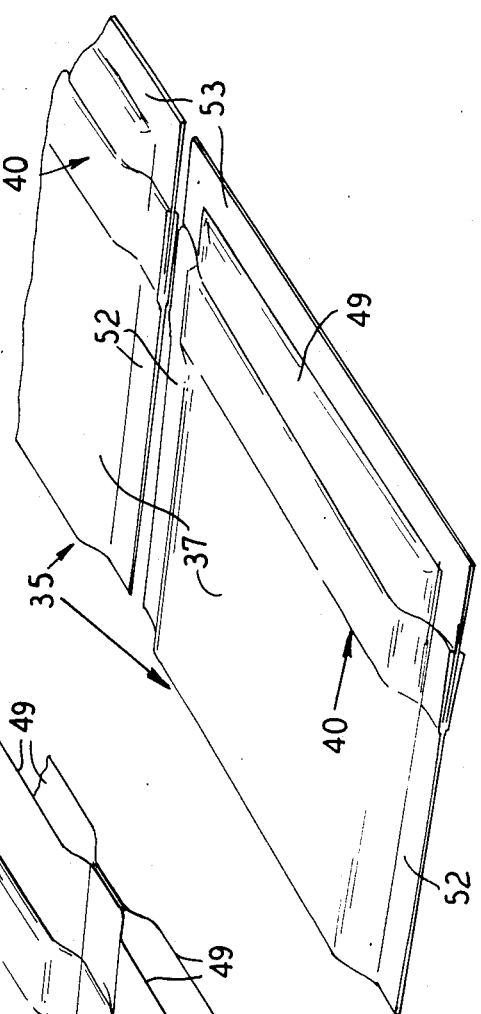
Figure 13:
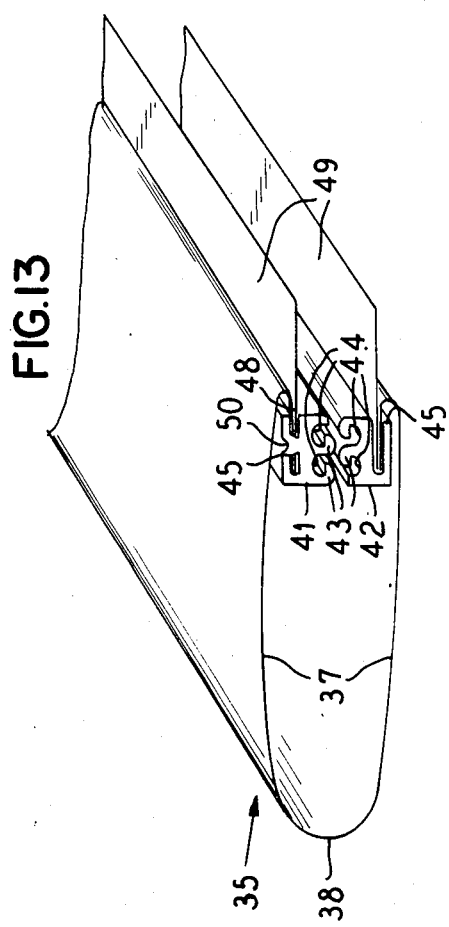

The assembly of bag body material 37 and zipper strips 41, 42 is then ready to be manipulated from the laid out or transversely flat production arrangement into the folded up bag formation as depicted in FIGS. 11–13. This may be effected, as shown, by swinging the side to which the zipper 42 is attached into complementary position relative to the side to which the zipper 41 is attached as indicated by the dashed arrow 54 in FIG. 11. Thereby, the bag wall 37 attached to the zipper strip 41 is pulled back over this zipper strip leaving the associated pull flange 49 projecting away from the zipper strip 41, as shown in FIG. 12. Then the zipper strip 42 is turned about its axis from the position shown in FIG. 12 into the position shown in FIG. 13 into complementary opposition to the zipper strip 41 as also shown in FIG. 13. This turns the pull flange 49 attached to the zipper strip 42 outwardly into opposing relation to the pull flange attached to the zipper strip 41, again as shown in FIG. 13. Thereafter, the zipper strips 41 and 42 may be interlocked to close the zipper 40 (FIG. 14) and the up to this point continuous ribbon of bag material may then be cross-sealed at successive bag section intervals by means of the cross seals 52.

Figure 14:
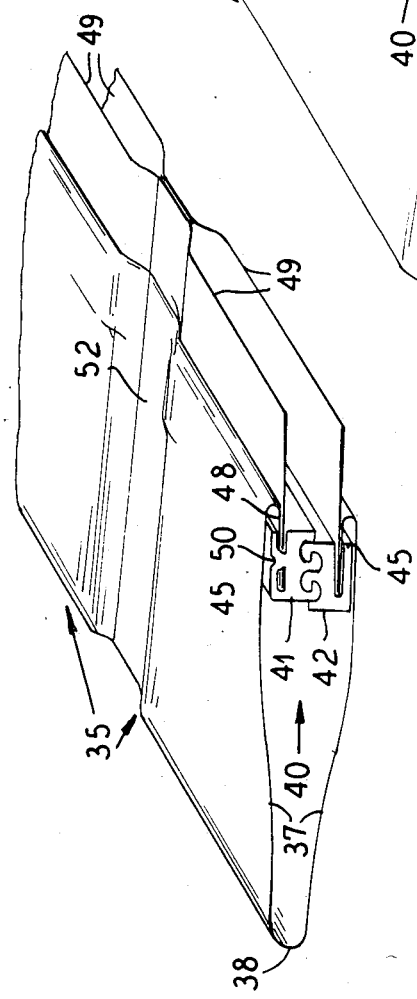

Generally, when reaching the stage in manufacture as depicted in FIG. 14, the series of bags 35 will be either stored for future use, or sent on directly to a filling station where the ribbon of bag sections will be located sequentially under a bag filling device such as a nozzle, the zipper 40 opened, the bag filled, and the zipper closed. Then (FIG. 15) the top seal 53 may be completed along the upper end portions of the pull flanges 49. At this time, also, the respective filled bags 35 may be separated from one another by severing along or otherwise separating the side seals 52, by which the bag sections up to that time have been connected together. Alternately the continuous ribbon of bag matserial may be sent to a form fill and seal machine, where the bag manufacture and filling of same are carried out in a series of sequential operations.

It will be understood that variations and modifications may be effected without departing from the spirit and scope of the novel concepts of the present invention.

I claim as my invention:

1. In a bag comprising a thin web material body having side margins and with an openable top flanked by opposed upwardly projecting pull flanges, and an extruded plastic zipper means carried by said body along said pull flanges, and wherein:

said bag body and said zipper means are fusibly incompatible;

said zipper means comprising a pair of fusible extruded plastic strips extending from side-to-side of said bag to and between said margins and having complementary separably interlockable zipper profiles and located parallel to and substantially below upper ends of said pull flanges;

each of said strips having a base parallel to said pull flanges;

holes in portions of the material of said bag body and aligned with said strips;

and fused connecting anchors extending from said zipper strips through said holes and permanently attaching said zipper strips to said bag body in a manner to effect cooperation of said strips with said pull flanges so that the profiles of said strips can be separated from an interlocked relation by pulling said pull flanges in respective opposite directions;

said holes being elongated with their length parallel to said zipper strips and said anchors being of elongated cross section complementary to said holes so as to strengthen the anchoring relationship of said anchors and said portions of the bag material and to resist stresses of pulling forces applied to said portions of the bag material bag and through said anchors when pulling the pull flanges apart and thereby pullingly separating the zipper profiles from their interlocked relation.

2. A bag according to claim 1, wherein said zipper strips have respective base groove sockets, and said portions of the material of said bag body having said holes being received in said sockets, and said anchors extend across said groove sockets and through said holes.

3. A bag according to claim 2, wherein said sockets are provided by return bent pull flanges on said zipper strips, and said portions of the material of the bag body within said sockets comprise said bag body pull flanges.

4. A bag according to claim 3, wherein said return bent pull flanges on said zipper strips extend beyond said margins within said sockets, and pilfer proof sealing means connecting said zipper pull flanges.

5. A bag according to claim 3, wherein one of said zipper strips has a flange therealong extending inwardly from the zipper profiles thereon, the portion of the return bent pull flange of said one zipper strip which is on the outer side of the associated body margin extending into overlapping relation to said zipper strip inwardly extending flange, and said overlapping return bent flange portion being attached to said zipper strip inwardly extending flange by means of fused connecting anchors extending through additional holes in said associated body margin.

6. A bag according to claim 2, wherein said base groove sockets open toward the open end of the bag, said portions of the bag body material comprise fold webs in the bag body at the inner sides of said pull flanges, and said fold webs having said holes.

7. A bag according to claim 6, wherein said pull flanges of the bag body have pilferproof sealing means therealong.

8. A bag according to claim 2, wherein said base groove sockets open towards the open end of the bag and wherein a part of the upper bag body is folded within said sockets and contains said holes, and a portion of said part extends out beyond said socket to act as a pull flange.

9. A bag according to claim 1, wherein said zipper means are located on the inside of the bag.

10. A method of making a bag equipped with extruded plastic reclosable zipper means, comprising:
forming a bag body from thin web material and having opposite side margins and an openable top flanked by opposed upwardly projecting pull flanges;
providing a pair of opposed extruded plastic zipper strips fusibly incompatible with the material of said bag body and having complementary separably interlockable zipper profiles and each strip having a base;
assembling said profile strips along said pull flanges with said bases parallel to said pull flanges, and locating said strips with their profiles substantially below upper ends of said pull flanges;
permanentaly attaching said zipper strips to said bag body by fusibly connecting anchors from said zipper strips through holes in said bag material in a manner to effect cooperation of said strips with said pull flanges so that said profiles of said strips can be separated from an interlocked relation by pulling said pull flanges in respective opposite directions;
and elongating said holes lengthwise of said fastener strips and correspondingly elongating the cross section of said anchors so as to strengthen the anchoring relationship of said anchors and said bag material to resist stresses from pulling forces applied to said bag material by said anchors when pulling the pull flanges apart and separating the profiles from an interlocked relation.

11. A method according to claim 10, which comprises providing said zipper strips with respective base groove sockets, receiving portions of the material of the bag body in said sockets, and extending said anchors across said groove sockets through said holes in the portions of the bag body within the groove sockets.

12. A method according to claim 11, which comprises having said base groove sockets opening toward the open end of the bag, and folding bag body material into webs to provide said portions of the material having the holes and receiving the fold webs in said groove sockets, and extending said upper end margins as pull flanges upwardly beyond said fold flanges.

13. A method according to claim 12, which comprises sealing said pull flanges for pilferproofing.

14. A method according to claim 10, which comprises providing return bent pull flanges on said zipper strips and thereby forming groove sockets, and receiving said margins in said groove sockets, said margins having said holes.

15. A method according to claim 14, which comprises extending said return bent pull flanges on said zipper strips beyond said ends within said groove sockets, and forming pilferproof sealing means connecting said pull flanges.

16. A method according to claim 10, which comprises locating said ziper means on the inside of the bag.

17. In a bag having a thin web material body having margins and with an openable top flanked by opposed upwardly projecting pull flanges, and an extruded plastic zipper means carried by said body along said pull flanges, and wherein:
said bag body and said zipper means are fusibly incompatible;
said zipper means comprising a pair of extruded plastic strips having complementary separably interlocked zipper profiles located substantially below upper ends of said pull flanges;
holes in portions the material of said bag body and aligned with said strips;
fused connecting anchors extending from said zipper strips through said holes and permanently attaching said zipper strips to said bag body;
and said holes and said anchors being elongated lengthwise of the longitudinal axis of said pull flanges so as to strengthen the anchoring relationship of said anchors to said pull flanges to resist stresses when pulling said pull flanges apart for separating the interlocked zipper profiles.

18. A bag according to claim 17, wherein said zipper strips have respective base groove sockets and said portions of the material of said bag body having said holes received in said sockets, and said anchors extend across said groove sockets and through said holes.

* * * * *

UNITED STATES PATENT AND TRADEMARK OFFICE
CERTIFICATE OF CORRECTION

PATENT NO. : 4,682,366
DATED : July 21, 1987
INVENTOR(S) : Steven Ausnit and Per Bentsen It is certified that error appears in the above—identified patent and that said Letters Patent is hereby corrected as shown below:

Column 2, line 34, cancel "isometric"

Column 2, line 62, after "ultimate", insert --bags--

Column 3, line 8, "releasibly" should be --releasably--

Column 3, line 21, "ziper" should be --zipper--

Column 3, line 44, "apetures" should be --apertures--

Column 3, line 62, "enterengagable" should be --interengageable--

Column 5, line 23, "with in" should be --within--

Column 5, line 63, "matserial" should be --material--

Column 7, line 27, "permanentaly" should be --permanently--

Column 8, line 21, "ziper" should be --zipper--

Column 8, line 33, after "portions", insert --of--

Signed and Sealed this

Fifth Day of January, 1988

Attest:

DONALD J. QUIGG

Attesting Officer   Commissioner of Patents and Trademarks